(12) United States Patent
Furumi et al.

(10) Patent No.: US 6,505,700 B2
(45) Date of Patent: Jan. 14, 2003

(54) REAR WHEEL STEERING DEVICE

(75) Inventors: Hiroshi Furumi, Wako (JP); Kunio Shirakawa, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/832,716

(22) Filed: Apr. 11, 2001

(65) Prior Publication Data

US 2001/0030075 A1 Oct. 18, 2001

(30) Foreign Application Priority Data

Apr. 13, 2000 (JP) .................................. 2000-112692
Mar. 6, 2001 (JP) .................................. 2001-061588

(51) Int. Cl.⁷ .............................................. B62D 5/04
(52) U.S. Cl. ..................... 180/412; 180/445; 180/446
(58) Field of Search ............................. 180/443, 444, 180/445, 446, 432, 411, 412, 413

(56) References Cited

U.S. PATENT DOCUMENTS

| 4,686,433 A | * | 8/1987 | Shimizu | |
| 4,741,409 A | * | 5/1988 | Westercamp et al. | 180/412 |
| 5,002,142 A | * | 3/1991 | Klosterhaus | |
| 5,261,500 A | * | 11/1993 | Bausch | |
| 5,289,891 A | * | 3/1994 | Sugiyama | |
| 5,323,866 A | * | 6/1994 | Simard | 180/6.28 |
| 5,327,986 A | * | 7/1994 | Saita | |
| 5,828,972 A | * | 10/1998 | Asanuma et al. | 701/41 |

FOREIGN PATENT DOCUMENTS

JP  2000079881  3/2001

* cited by examiner

Primary Examiner—Anne Marie Boehler
(74) Attorney, Agent, or Firm—Merchant & Gould P.C.

(57) ABSTRACT

A rear wheel steering device steers rear wheels of a vehicle by using two electric motors. When the two electric motors are in normal condition, both electric motors are driven to steer the rear wheels. When one electric motor is in an abnormal state while the other electric motor is in a normal state and when a vehicle speed exceeds a given speed, the steering device controls steering of the rear wheels by using only the other electric motor being in normal condition. Since the employed electric motors are small-sized and inexpensive, the rear wheel steering device can be downsized and provided at a relatively low cost.

2 Claims, 13 Drawing Sheets

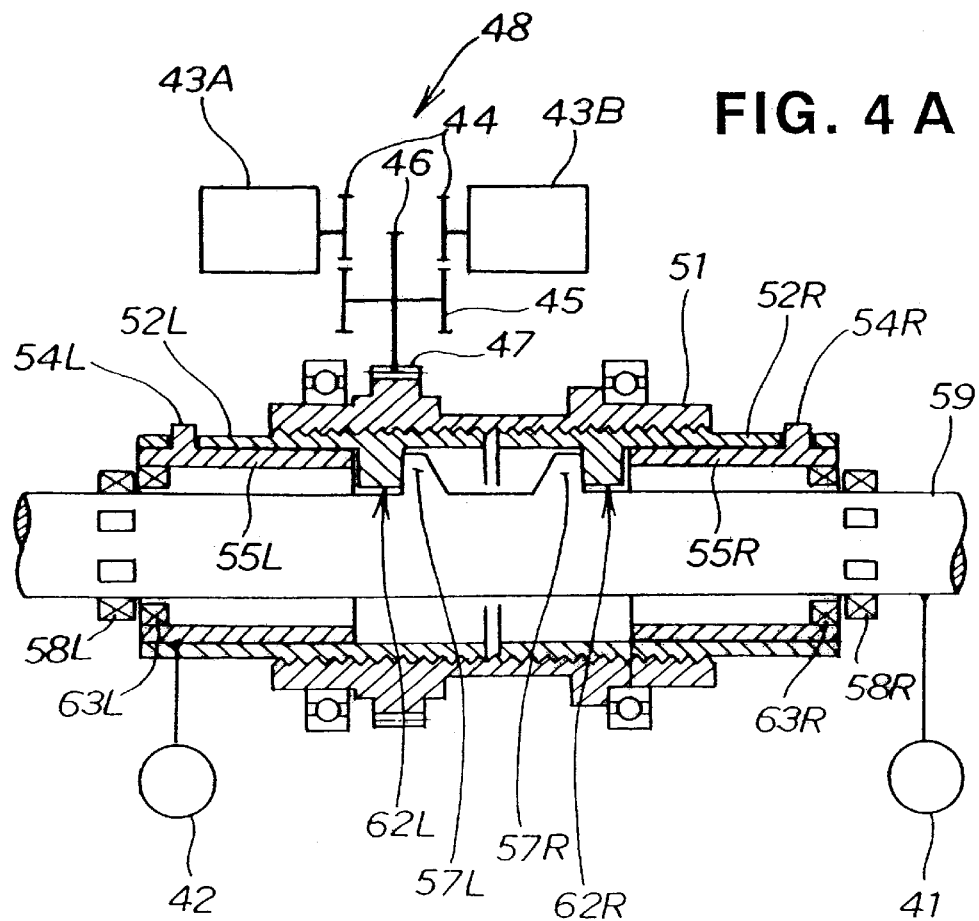
FIG. 4A
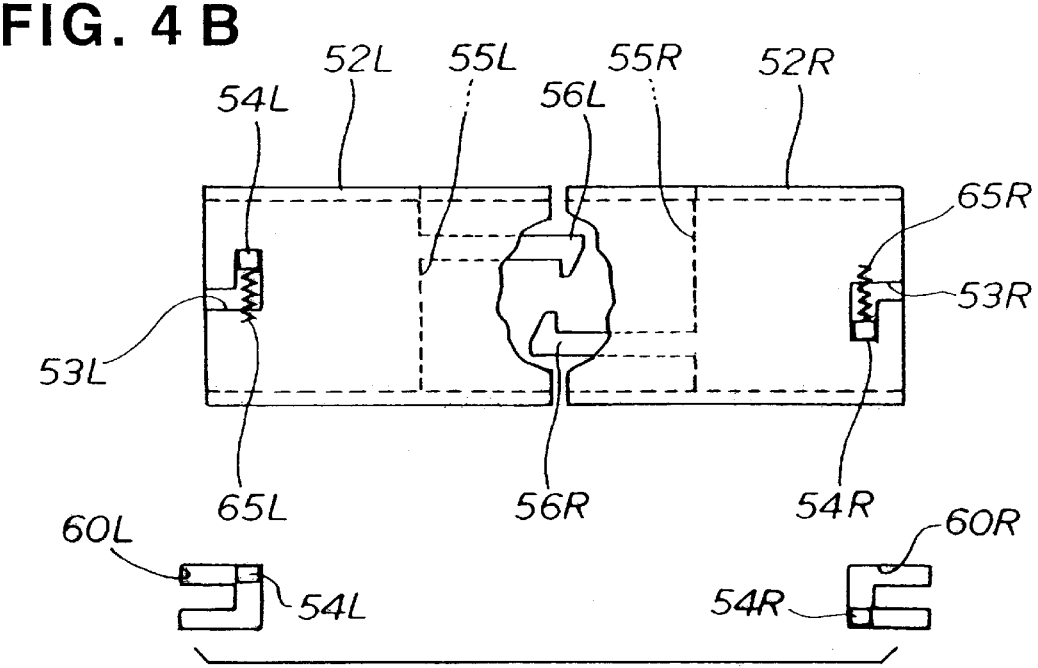
FIG. 4B
FIG. 4C

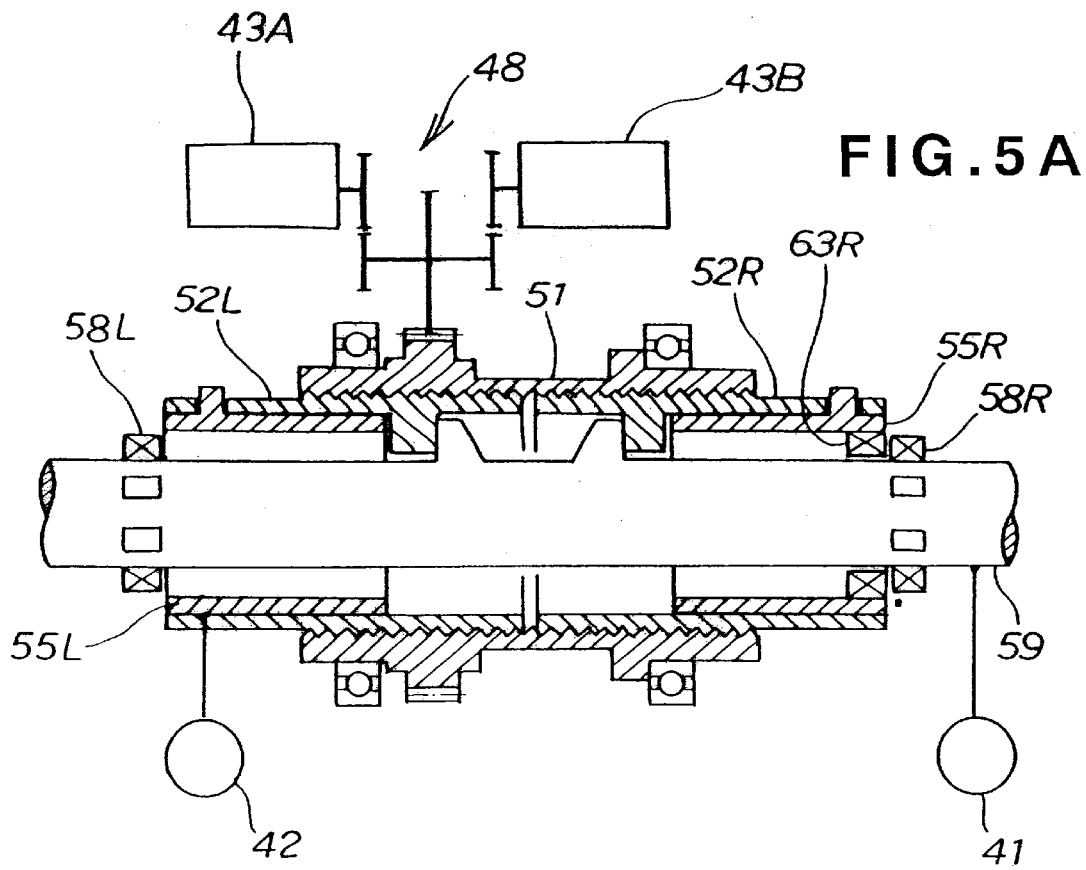
FIG.5A
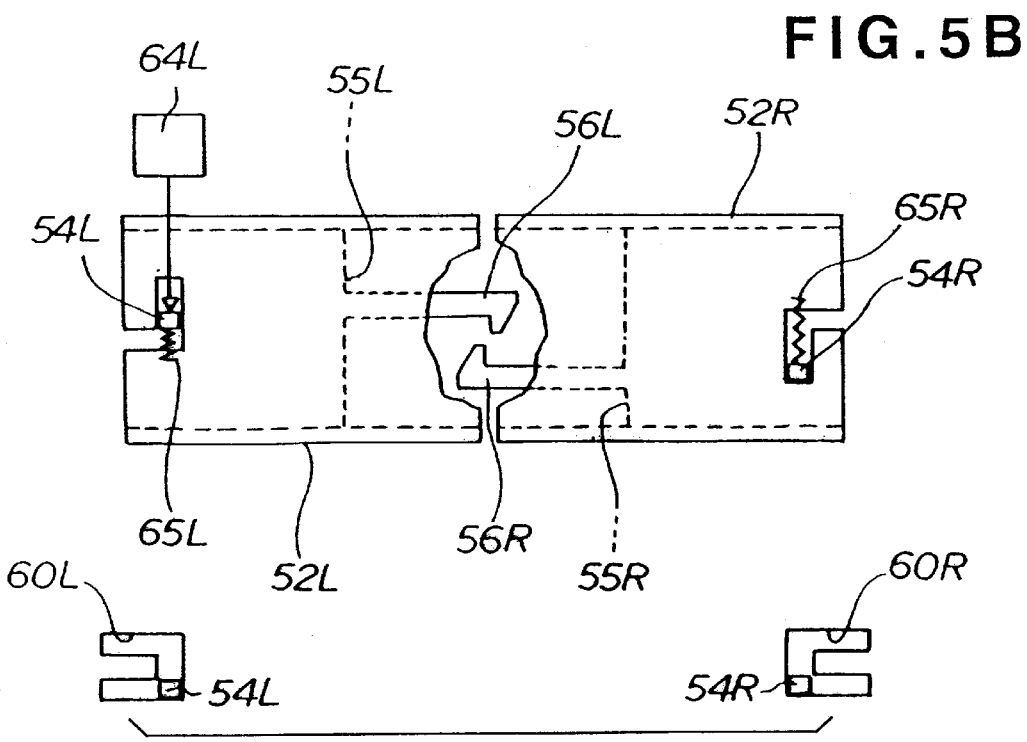
FIG.5B
FIG.5C

REAR WHEEL STEERING DEVICE

BACKGROUND OF THE INVENTION

1. Field of the Invention

This invention relates to rear wheel steering devices for use in four wheel steered vehicles (4WS) and, more particularly, to rear wheel steering devices driven by an electric motor.

2. Description of the Related Art

In recent years, 4WS or four-wheel steering has become popular because it improves motion characteristics of a vehicle by steering rear wheels in conjunction with front wheel steering. It is essential for such 4WS to install a rear wheel steering device to steer rear wheels in conjunction with front wheel steering. This type of rear wheel steering device is disclosed in Japanese Patent Laid-Open Publication No. 2000-79881 filed by the applicant of the present application.

The aforementioned rear wheel steering device is shown in FIGS. 13A to 13C hereof. An operation of the aforementioned rear wheel steering device will be described below with reference to those drawings.

In FIG. 13A, a lifting screw 102 is rotated by an electric motor 101, thereby moving left and right slide blocks 103L and 103R to the left and right sides, respectively.

Since the left slide block 103L remains in a clutch off state, the left side block 103L is moved to the left side with the position of left clutch ring 104L remaining unchanged.

The right slide block 103R remains in a clutch-on state, and consequently, a plurality of internal teeth 105R, which inwardly project from an inner periphery of the right slide block 103R, may push a plurality of external teeth 114R which outwardly project from an outer periphery of the right clutch ring 104R. Therefore, sliding forth is sequentially transmitted to the right slide block 103R, to right clutch ring 104R, to right lock ring 106R and then to steering shaft 107, moving a steering shaft 107 to the right direction as shown by arrow to steer rear wheels.

In such a condition, left and right arms 110L and 110R, which project outwardly from outer peripheries of the left and right clutch rings 104L and 104R, respectively, and which engage in a guide slot 109 (shown in the upper portion of FIG. 13A) formed in an inner periphery of a case (not shown), are movable to the right direction, so that they do not interrupt an axial movement of the steering shaft 107.

An incremental stroke value relative to the center of the steering shaft 107 can be adjusted without any restraint by rotating the electric motor 101, and can be measured by a steering angle sensor 112. Since the steering angle corresponds to a deflected angle of the wheel (designated by reference character θ in FIG. 14) and the steering angle is obtained by converting the incremental stroke value into an angle, a stroke sensor will be referred to as a steering angle sensor 112.

The incremental stroke value of the left slide block 103L can be measured with a driving angle sensor 113. Since the driving angle is determined by converting the incremental stroke of the slide block 103L into an angle, a stroke sensor will be referred to as a driving angle sensor 113.

FIG. 13B shows that the right clutch ring 104R has been moved to the right direction by the internal teeth 105R in abutting engagement with the external teeth 114R.

FIG. 13C shows a relationship between the right slide block 103R, after the electric motor 101 in FIG. 13A has been rotated in a reversed direction, and the central flange 115 that radially protrudes in a central area of an axial direction of the steering shaft 107. By rotating the lifting screw 102 in a reverse direction, the right slide block 103R is moved leftward to cause the right slide block 103R to directly push the central flange 115 leftward.

FIG. 14 shows an operational principle of the conventional rear wheel steering device. A control device 117 receives the steering angle control data and starts the electric motor 101 responsive to the control data. When the lifting screw 102 is rotated by the electric motor 101, the left and right slide blocks 103L and 103R are moved away from each other. The steering shaft 107 is moved to the right direction by the right slide block 103R. The control device 117 compares the steering angle data delivered from the steering angle sensor 112 with the steering angle control data (produced by the front wheel steering system, not shown) and controls the steering angle θ based on the steering angle control data such that, when the steering angles θ of the rear wheels 118L and 118R coincide with the steering angle control data, the operation of the electric motor 101 is stopped.

The electric motor 101 must generate output power sufficient enough to steer the rear wheels to a specified direction immediately. The more output power is required, the larger the external diametrical dimensions (external dimension and length) of the electric motor become. Larger external diametrical dimensions interrupt miniaturization of the rear wheel steering device. Generally, small-sized electric motors can be mass produced and hence are inexpensive. On the other hand, production volume of large-sized electric motors is too small to be cost effective. The electric motor 101 has a large rated output power and hence is expensive. This prevents cost reduction of the rear wheel steering device.

SUMMARY OF THE INVENTION

It is therefore an object of the present invention to provide a rear wheel steering device which is compact in construction and low in manufacturing cost by rendering electric motors compact in size and low in cost.

According to an aspect of the present invention, there is provided a rear wheel steering device for use in a vehicle, which device comprises two electric motors serving as drive sources for steering rear wheels of the vehicle, and a rear wheel steering control device for controlling the two electric motors to drive in case both of the two electric motors are judged to operate in a normal condition on the basis of motor condition signals indicative of how the two electric motors are working.

The rear wheel steering device is driven by two electric motors. If output power is reduced by 50%, it becomes possible to employ small sized and low cost electric motors This results in achieving the desired miniaturization and cost reduction of the rear wheel steering device.

Desirably, the rear wheel steering device further includes a vehicle speed sensor for detecting a vehicle speed. The rear wheel steering device may be designed such that when one of the electric motors is in an abnormal state while the other one of the electric motors is in a normal state and when the vehicle speed detected by the vehicle speed sensor exceeds a give speed, it controls steering of the rear wheels using only the one electric motor being in normal state. That is, even when one of the electric motors goes out of a normal condition, the rear wheels can be steered using only the other electric motor remaining in normal condition as long as a given condition is satisfied. The given condition may be when the vehicle speed exceeds a predetermined speed. When the vehicle speed is below the predetermined value, the resulting steering torque is large and this will act as an overload on the electric motor of ½ (50%) output power. Thus, the rear wheels are steered only by the normal electric motor when the vehicle speed exceeds the given vehicle speed.

Preferably, the rear wheel steering device further comprises a vehicle speed sensor for detecting a vehicle speed. When one of the electric motors is in an abnormal state while the other one of the electric motors is in a normal state and when the vehicle speed detected by the vehicle speed sensor exceeds a given speed, the rear wheel steering control device controls, using only the in-normal-state electric motor, steering of the rear wheels to cause the rear wheels to be returned to a neutral position. That is, when a certain condition is satisfied, the rear wheels can be returned to the neutral position using only the normal electric motor even though defects are detected in either one of the two electric motors. The certain condition may be when the vehicle speed exceeds the given vehicle speed. When the vehicle speed is over the given speed, small steering torque is required for steering the rear wheels and hence only the normal electric motor of ½ power output can achieve the intended drive control. Accordingly, the rear wheels are arranged to be steered using only the normal electric motor to cause the rear wheels to be returned to the neutral position when the vehicle speed exceeds the given vehicle speed.

BRIEF DESCRIPTION OF THE DRAWINGS

A preferred embodiment of the present invention will be described in more detail below, by way of example only, with reference to the accompanying drawings, in which:

FIGS. 4A to 4C illustrate an operation of the steering shaft positioned at a neutral position in the rear wheel steering mechanism shown in FIG. 2;

FIGS. 5A to 5C illustrate an operation of the steering shaft with the left clutch removed under the conditions shown in FIGS. 4 to 4C;

DETAILED DESCRIPTION OF THE PREFERRED EMBODIMENT

The following description is merely exemplary in nature and is in no way intended to limit the invention, its application or uses.

Figure 1:
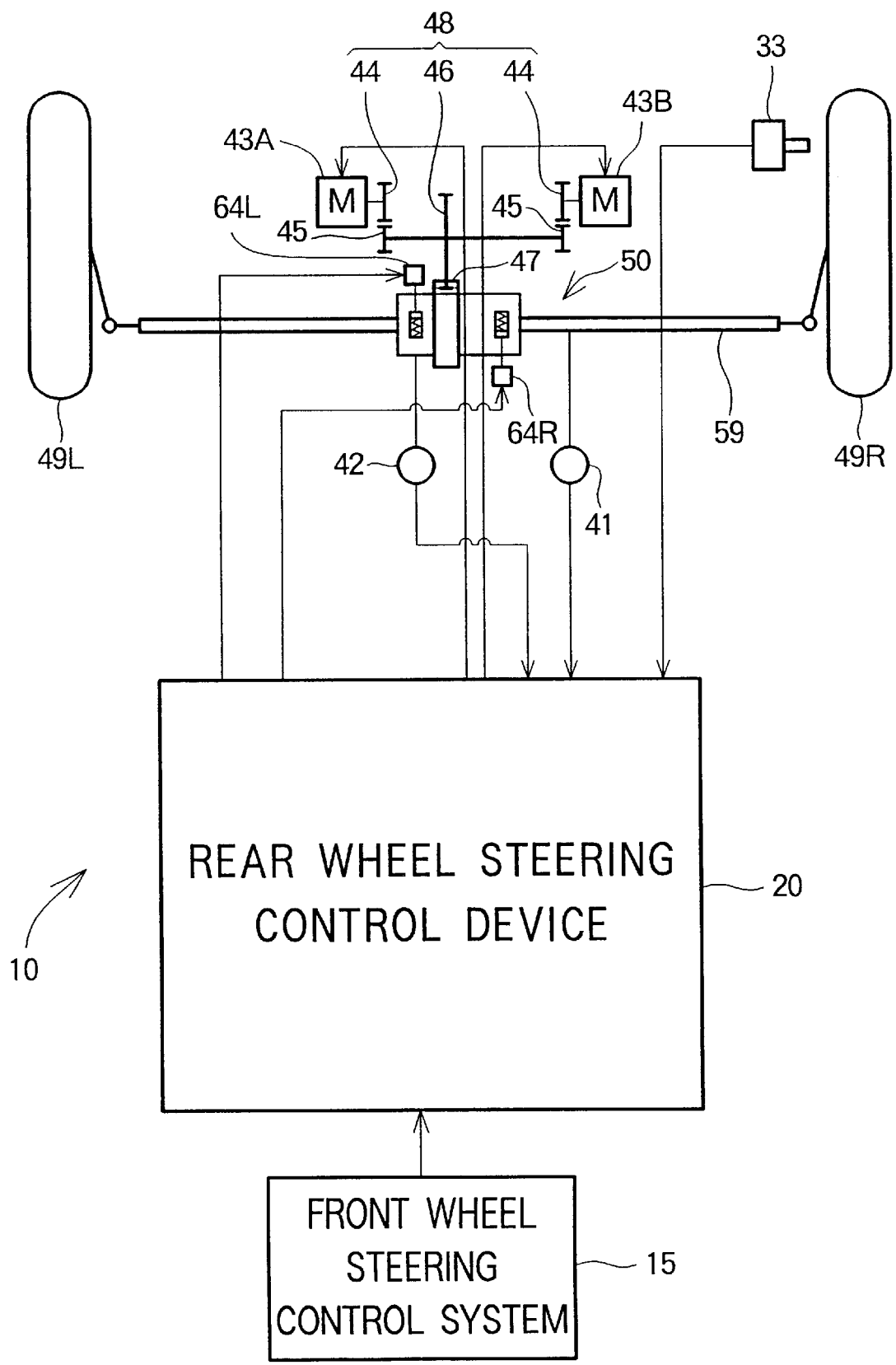
FIG. 1 is a schematic view of a rear wheel steering device according to the present invention.

Referring now to FIG. 1, a rear wheel steering device 10 comprises a rear wheel steering control device 20 for controlling steering of rear wheels of a vehicle in response to signals from a front wheel steering control system 15, a steering angle sensor 41 for supplying steering angle data to the control device 20, a driving angle sensor 42 for supplying driving angle data to the control device 20, two electric motors 43A and 43B to be driven in response to control of the control unit 20, a gear reduction mechanism 48 comprised of gears 44,45,46,47 for transmitting rotational forces of the electric motors 43A and 43B, and a rear wheel steering mechanism 50 for steering left and right rear wheels 49L and 49R in response to power input imparted from the final gear 47.

Figure 2:
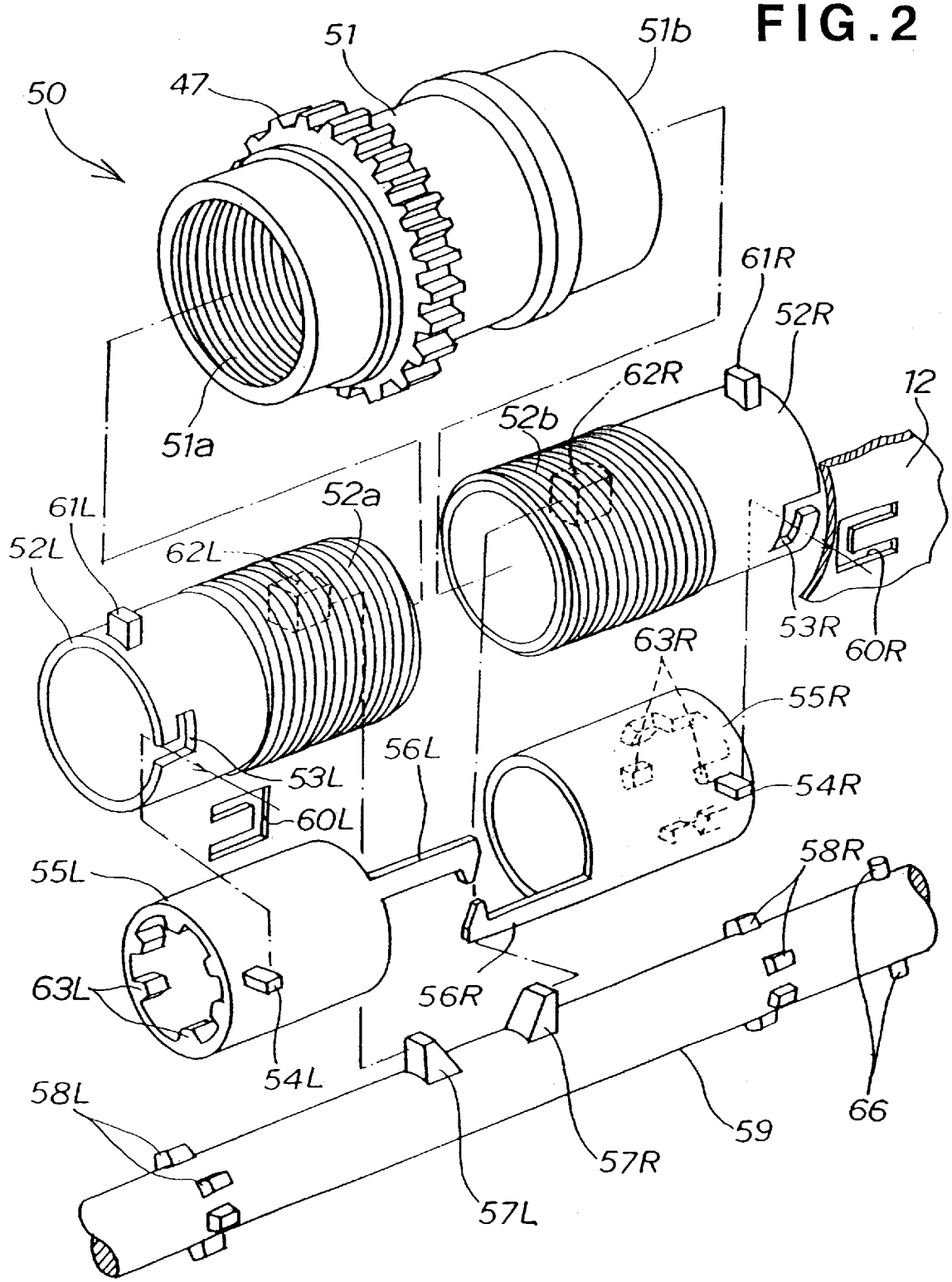
FIG. 2 is an exploded, oblique perspective view of relevant part of a rear wheel steering mechanism shown in FIG. 1.

Referring now to FIG. 2, the rear wheel steering mechanism 50 includes a cylindrical threaded member (hereinafter referred to as "threaded cylinder") 51, left and right cylindrical slide members (hereinafter referred to as "slide cylinders") 52L and 52R for meshing with the threaded cylinder 51, left and right cylindrical clutch rings 55L and 55R accommodated in the left and right slide cylinders 52L and 52R, and a steering shaft 59.

An outer circumferential periphery of the threaded cylinder 51 is formed with a gear section 47 for receiving power supplied from the electric motors 43A and 43B, described with reference to FIG. 1, via the reduction gear mechanism 48. An inner circumferential periphery of the threaded cylinder 51 has a pair of female threads 51a and 51b which are spaced from one another along a longitudinal direction and formed in opposite directions, respectively.

The left and right slide cylinders 52L and 52R have male threads 52a and 52b, which mesh with the female threads 51a and 51b of the threaded cylinder 51 respectively. The left and right slide cylinders 52L and 52R have L-shaped cutouts 53L and 53R.

The left and right clutch rings 55L and 55R are accommodated in the left and right slide cylinders 52L and 52R, respectively. Under the conditions in which the left and right clutch rings 55L and 55R are received in the left and right slide cylinders 52L and 52R, respectively, left and right arms 54L and 54R, which are formed on the left and right clutch rings 55L and 55R, respectively, extend through the L-shaped cutouts 53L and 53R in engagement with a case 12, which receives the rear wheel steering mechanism 50. The left clutch ring 55L has a left lock tub 56L, which extends toward the right clutch ring 55R. The right clutch ring 55R has a right lock tub 56R, which extends toward the left clutch ring 55L.

A central portion of the steering shaft 59 has a pair of radially extending left and right centerpieces 57L and 57R. The steering shaft 59 also has a plurality of left and right external teeth 58L and 58R which are spaced from the centerpieces 57L and 57R, respectively, in an axial direction with a given distance.

Reference numerals 61L and 61R designate outwardly extending anti-rotation projections formed on an outer circumferential periphery of the slide cylinders 52L and 52R, respectively. These anti-rotation projections 61L and 61R engage with the guide recesses (not shown) formed in the case 12, thereby interrupting rotation of the slide cylinders 52L and 52R while allowing sliding movement of the slide cylinders 52L and 52R. Reference numerals 62L and 62R designate inward projections formed inside the slide cylinder 52L and 52R, respectively, and protruding towards the center of the steering shaft 59. Operation of these projections 62L and 62R will be described below. Reference numeral 66 designates anti-rotation pins 66 formed on the steering shaft 59 and extending radially outward. The anti-rotation pins 66 engage with guide recesses (not shown) to allow lateral sliding movement of the steering shaft 59, while interrupting rotation thereof.

Figure 3:
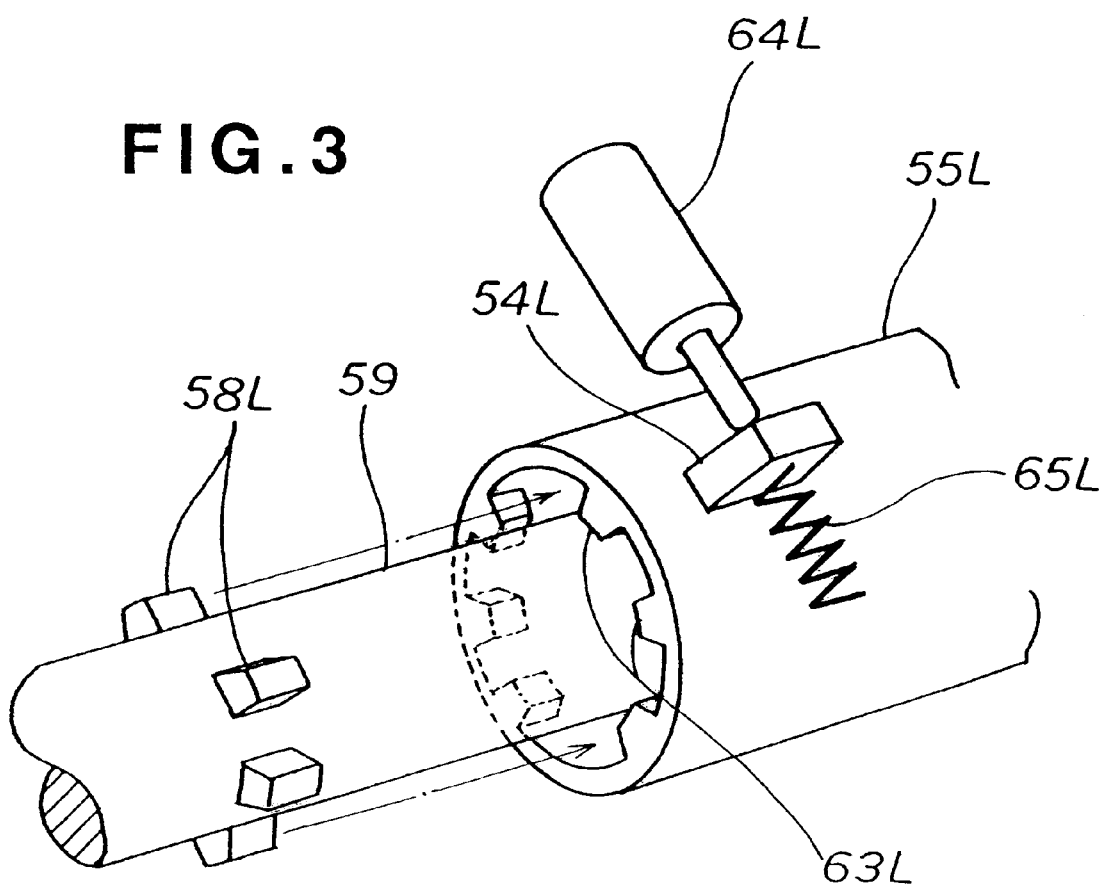
FIG. 3 is an oblique perspective view of clutch conditions of the steering shaft and a left clutch ring of the rear wheel steering mechanism shown in FIG. 2.

Referring now to FIG. 3, an inner periphery of a left side distal end of the left clutch ring 55L has internal teeth 63L formed in a circumferentially equidistantly spaced relationship. The internal teeth 63L are formed so as to oppose a plurality of external teeth 58L formed on the steering shaft 59. The external teeth 58L and internal teeth 63L face with each other, providing a clutch-on state. Under the clutch-on state, when a left actuator 64L moves the arm 54L of the clutch ring 55L to cause the clutch ring 55L to rotate by a half pitch of the internal teeth 63L, the external teeth 5$L and internal teeth 63L, which have been previously facing with each other, are displaced in circumferential direction from one another such that the external teeth 58L is positioned in between the internal teeth 63L. This turns to the clutch-off condition. Under such a clutch-off condition, since the external teeth 58L and the internal teeth 63L are not held in abutting engagement with each other, the steering shaft 59 and the clutch ring 55L may move along the axial direction relative to one another. Although FIG. 3 illustrates only the left clutch ring 55L, the right clutch ring 55R and the steering shaft 59 have the same structures as those of the left clutch ring 55L and the steering shaft 59.

The rear wheel steering mechanism of the preferred embodiment employs a so called "opposite operation" system, in which the clutch-off condition is set up when the left and right actuators 64L and 64R (see FIG. 1) are energized and the clutch-on condition is set up when both of the above actuators are de-energized. In the preferred embodiment, the time period to be clutch-on state is preset to be remarkably larger than that of the clutch-off state, thereby reducing the time period to be energized while extending time period to be de-energized. This results in substantial savings of power consumption of the left and right actuators 64L and 64R, with a resultant decrease in load of a power supply such as a battery.

Now, operation of the rear wheel steering mechanism is described in detail below with reference to FIGS. 4A to FIG. 7.

In FIG. 4A, when the electric motors 43A and 43B are turned on, the threaded cylinder 51 is rotated through the reduction gear mechanism 48 such that the left and right slide cylinders 52L and 52R are moved to the right and left sides, respectively. In this event, the inward projection 62L of the left slide cylinder 52L is brought into abutting engagement with the centerpiece 57L to allow the steering shaft 59 to move in the right direction, and the inward projection 62R of the right slide cylinder 52R are brought into abutting engagement with the centerpiece 57R of the steering shaft 59 to cause the steering shaft 59 to move in the left direction such that the steering shaft 59 is located in a neutral position.

The incremental stroke value of the steering shaft 59 is monitored with the steering angle sensor 41, and the position of the left slide cylinder 52L is monitored with the driving angle sensor 42. During this monitoring step, the external teeth 58L and 58R are caused to oppose the internal teeth 63L and 63R,respectively, and both the left and right clutches are brought into the clutch-on condition.

Referring to FIG. 4B, when the steering shaft 59 (see FIG.4A) remains in the neutral position, the arms 54L and 54R are urged in the opposite directions towards distal ends of the cutouts 53L and 53R by the forces of the return springs 65L and 65R. As a consequence, the left and right lock tabs 56L and 56R, which extend from the left and right clutch rings 55L and 55R, respectively, are moved apart from each other in the opposite directions (i.e., upper and lower directions as shown in FIG. 4B).

In FIG. 4C, the arm 54L is located at the upper end of the U-shaped left guide recess 60L and the arm 54R is located at the lower end of the U-shaped right guide recess 60R.

In FIG. 5B, when the left actuator 64L is energized and the rod of the actuator 64L moves forward, the left arm 54L is depressed against the force of the return spring 65L, thereby rotating the left clutch ring 55L. In this event, the left lock tab 56L approaches the right lock tab 56R, however, that is not close enough to be meshed with each other. In this case, the left arm 54L motes to the lower end of the guide recess 60L as shown in FIG. 5C.

In FIG. 5A, when the left clutch ring 55L is rotated in a manner discussed above, the left internal teeth 63L (see FIG. 4A) is displaced in a circumferential direction relative to the associated left external teeth 58L, allowing the left clutch ring 55L to be bought into the clutch-off condition. Since, in this event, the right internal teeth 63R remains in opposed relationship with the right external teeth 58R, the right clutch ring 55R is held in the clutch-on condition.

Figure 6A:
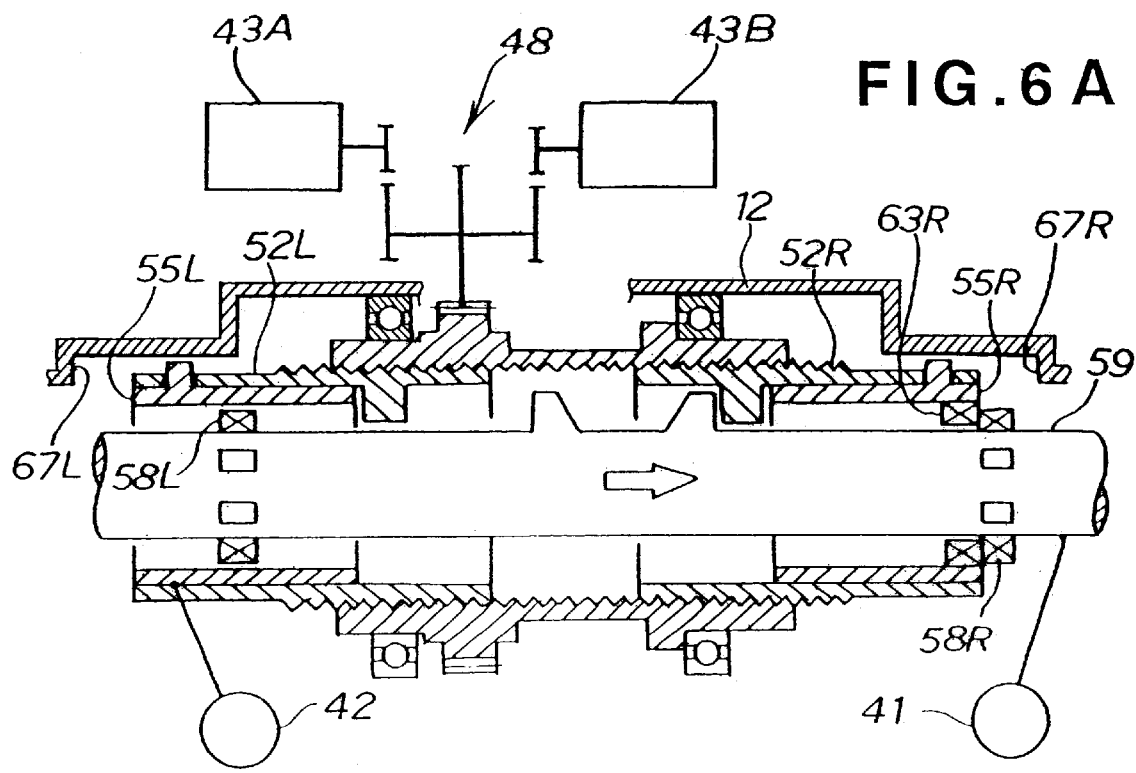
FIGS. 6A to 6C illustrate an operation of the steering shaft which is transferred to the right direction by the right clutch-on state under the conditions shown in FIGS. 5A to 5C.

Thereafter, when the threaded cylinder 51 is rotated by the electric motors 43A and 43B via the reduction gear mechanism 48 as viewed in FIG. 6A, the left and right slide cylinders 52L and 52R are moved away from each other in the opposite directions.

In FIG. 6A, when the left and right slide cylinders 52L and 52R are moved away from each other in the opposite directions, since the internal teeth 63R of the right clutch ring 55R pushes the external teeth 58R of the steering shaft 59, the steering shaft 59 is moved in the right direction as shown by an arrow in FIG. 6A. Reference numerals 67L and 67R designate full-open restriction stoppers formed in the case 12. These stoppers 67L and 67R provide limits for the maximum outermost lateral movements, which correspond to the full-open positions of the left and right slide cylinders 52L and 52R.

During movement of the steering shaft 59 as shown by the arrow in FIG. 6A, since the left external teeth 58L is moved within the left clutch ring 55L, the steering shaft 59 is allowed to move rightward. The position of the steering shaft 59 is monitored with the steering angle sensor 41 while the position of the left slide cylinder 52L is monitored by the driving angle sensor 42.

Figure 6B:
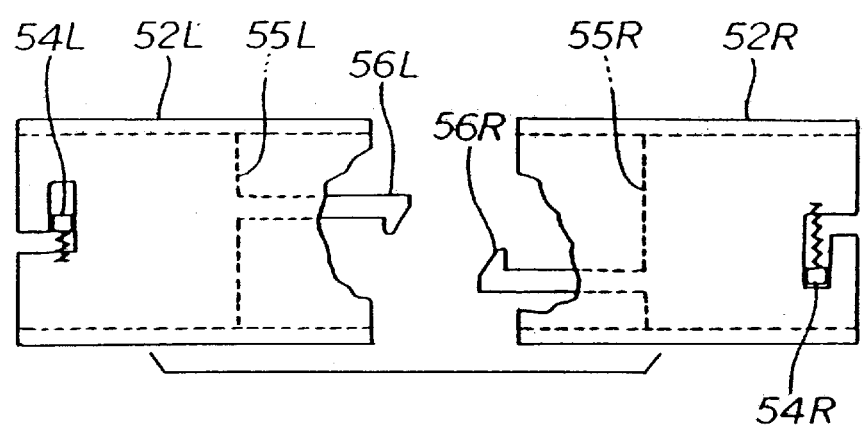

As shown in FIG. 6B, the left and right slide cylinders 52L and 52R, and the left and right clutch rings 55L and 55R are separately moved from each other.

Figure 6C:

As shown in FIG. 6C, the left arm 54L moves to the left side in a lower level slot of the left guide recess 60L and the right arm 54R moves to the right side in a lower level slot of the right guide recess 60R. While omitted in the drawings, when the steering shaft 59 is moved leftward from the neutral position, the left and right arms 54L and 54R are moved away from each other in "the upper level slots" of the left and right guide recesses 60L and 60R, respectively.

Figure 7:
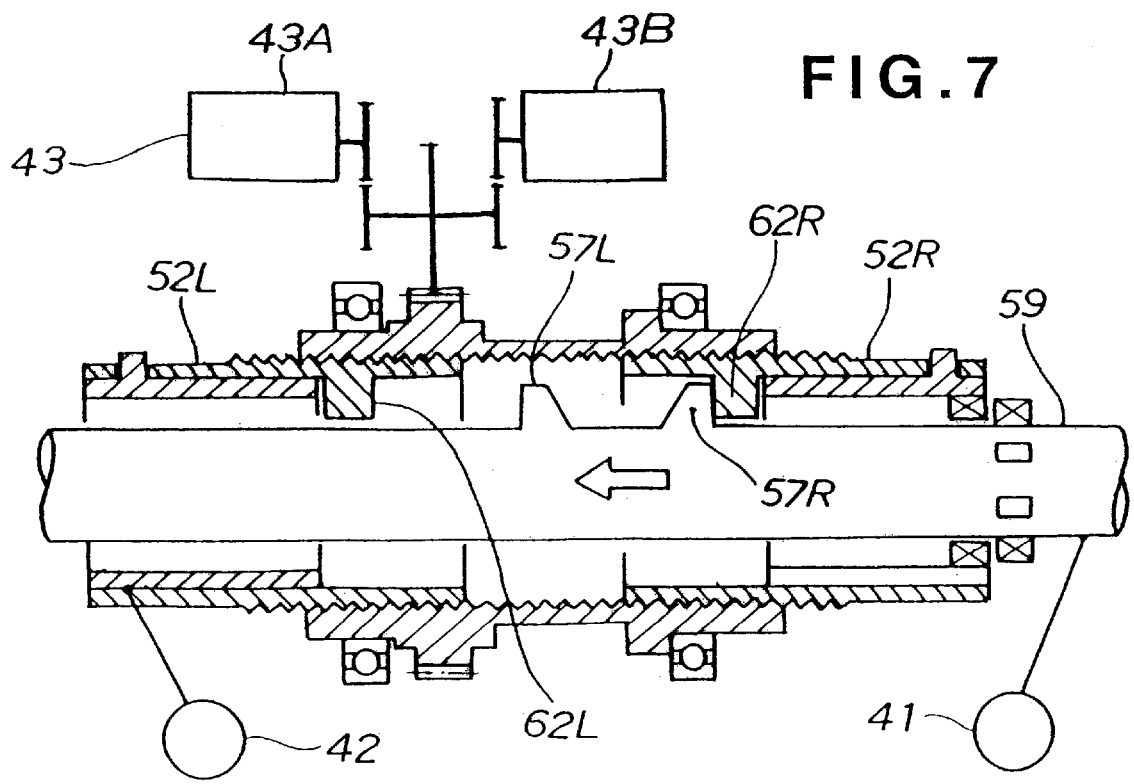
FIG. 7 illustrates an operation of the steering shaft which is transferred to the left direction under the conditions shown in FIG. 6.

In FIG. 7, when the electric motors 43A and 43B are rotated in the reverse direction, the left and right slide cylinders 52L and 52R are caused to move toward each other. Since, in this instance, the centerpiece 57R of the steering shaft 59 is pushed by the projection 62R of the right slide cylinder 52R, the steering shaft 59 is moved in the left direction as shown by an arrow in FIG. 7. Thereafter, when the left centerpiece 57L is brought into contact with the projection 62L of the left slide cylinder 52L, the steering shaft 59 returns to the neutral position shown in FIG. 4A.

As described above with reference to FIG. 5B, when the left actuator 64L is energized, the left clutch ring 55L is held in the clutch-off condition and the right clutch ring 55R is held in the clutch-on condition. However, when defects are encountered in the left actuator 64L, the rod would not move backwards (that is, because the left clutch ring 55L is not switched over to the clutch-on condition) and the left actuator 64L remains unchanged in the clutch-off condition even when the left actuator 64L is de-energized. In the event the left clutch ring 55L remains unchanged in the clutch-off condition, if the right clutch ring 55R is changed over to the clutch-off condition, there will be a risk for both the left and right clutch rings 55L and 55R to be brought into the clutch-off condition.

In the event both the left and right clutch rings 55L and 55R remain in the clutch-off condition, if the left and right slide cylinders 52L and 52R are moved away from each other in the opposite directions by turning the threaded cylinder 51 (see FIG. 2), the steering shaft 59 tends to freely move in an axial direction. Since this movement is unacceptable, a measure has been undertaken in the preferred embodiment as shown in FIG. 8.

Figure 8:
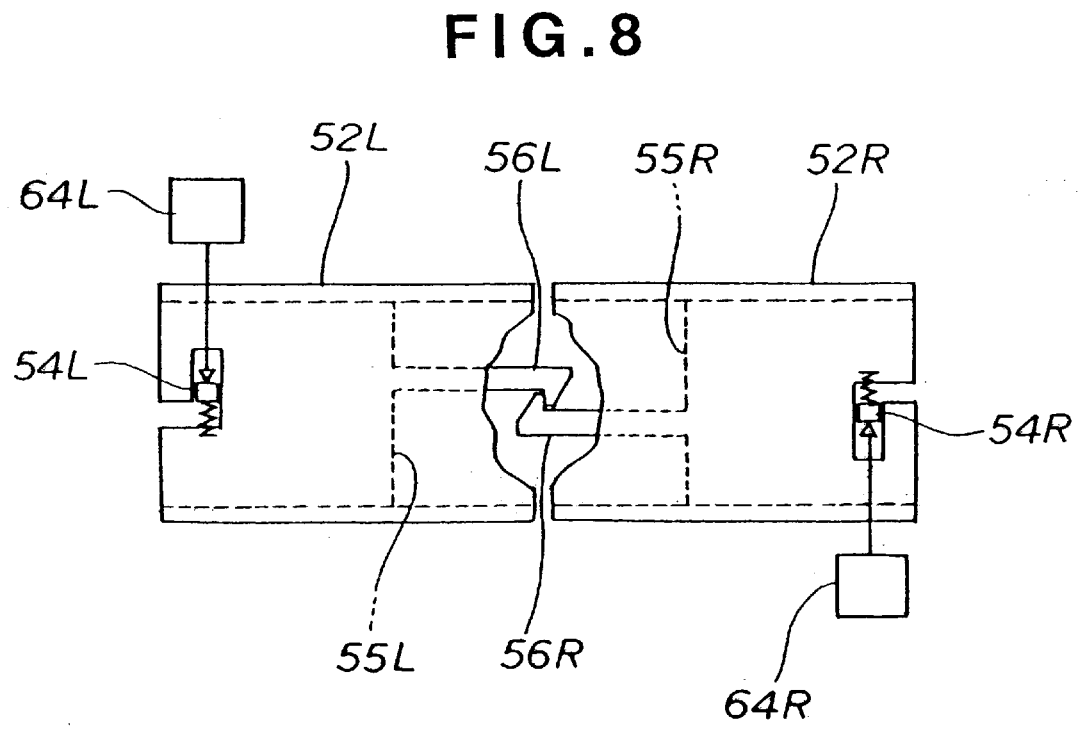
FIG. 8 illustrates an operation of the lock tab to maintain the neutral position of the steering shaft.

That is, in the event both the left and right actuators 64L and 64R are energized, if the left and right actuators 64L and 64R are encountered with abnormal conditions such as locked states, the left and right lock tabs 56L and 56R are caused to engage with each other as shown in FIG. 8. Thus, the left and right slide cylinders 52L and 52R are prevented from being separated from one another and the left and right clutch rings 55L and 55R are not separated from one another. As a result, there will be no risk for the steering shaft 59 to inconveniently move in the left or right directions. In this manner, the provision of the lock tabs 56L and 56R allows the steering shaft 59 to remain in the neutral position even when either one or both of the left and right actuators 64L and 64R are encountered with a trouble.

When both the left and right actuators 64L and 64R are de-energized and both the left and right clutch rings 55L and 55E remain in the clutch-on condition (see FIG. 4A), the steering shaft 59 is maintained in the neutral position by the left and right internal teeth 63L and 63R.

Now, the rear wheel steering control device 20 for controlling steering of rear wheels is described below with reference to FIGS. 9 to 12.

Figure 9:
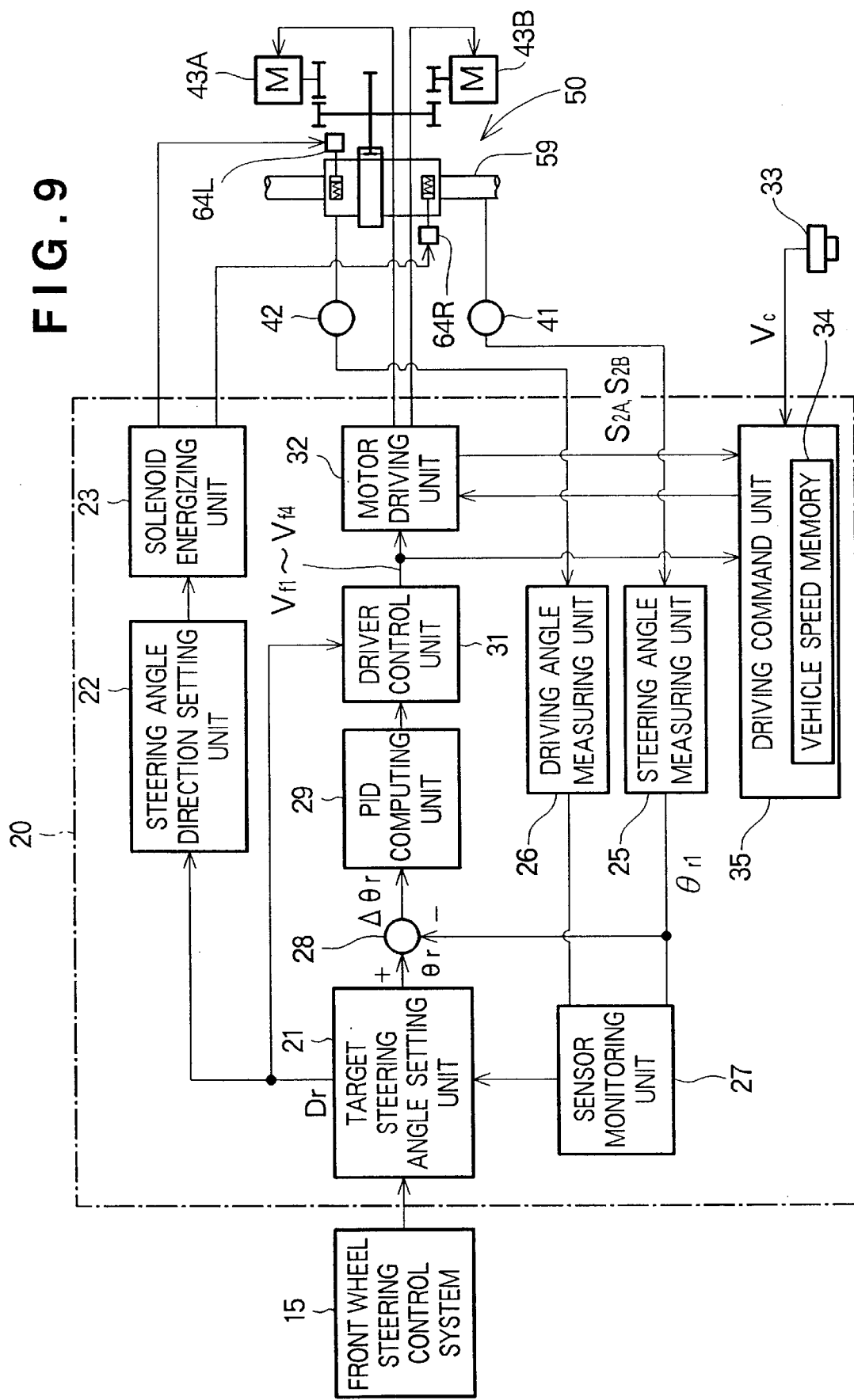
FIG. 9 is a function block diagram of the rear wheel steering control device shown in FIG. 1.

In FIG. 9, the rear wheel steering control device 20 comprises a target steering angle setting unit 21, a steering angular direction setting unit 22, a solenoid energizing unit 23, a steering angle measuring unit 25, a driving angle measuring unit 26, a sensor monitoring unit 27, a subtraction unit 28, a PID computing unit 29, a driver control unit 31, a motor driver unit 32, a vehicle speed sensor 33 for detecting vehicle speed to produce a vehicle speed signal Vc, a vehicle speed memory 34 for storing a vehicle speed threshold value vs, and a driving command unit 35 incorporating the vehicle speed memory.

The target steering angle setting unit 21 sets a target steering angle of the rear wheels corresponding to the front wheels on the basis of command signals fed from the front wheel steering control system 15 and outputs a steering angle signal θr.

The steering angular direction setting unit 22 determines which the rear wheels shall be steered to, left or right based on the target steering angle signal Dr which is output from the target steering angle setting unit 21.

The solenoid energizing unit 23 optionally energizes either the left actuator 64L or the right actuator 64R responsive to the steering angular direction signal fed from the steering angle direction setting unit 22.

The steering angle measuring unit 25 converts an incremental stroke value, detected by a steering angle sensor 41, into a steering angle and outputs a current steering angle signal $θr_1$.

The driving angle measuring unit 26 converts an incremental stroke value, detected by a driving angle sensor 42, into a driving angle signal.

The subtraction unit 28 subtracts the current steering signal $θr_1$, output by the steering angle measuring unit 25, from the target steering angle signal θr, output from the target steering angle setting unit 21, and outputs an error steering angle signal Δθr.

The PID computing unit 29 computes the error steering angle signal Δθr given from the subtraction unit 28 by implementing PID operations (proportion, integral and differential), thereby producing an output signal.

The driver control unit 31 produces a pulse width modulation (PWM) signal responsive to the output signal delivered from the PID computing unit portion 29 and the target steering angle signal Dr output from the target steering angle setting unit 21. The motor driver unit 32 drives two electric motors 43A and 43B responsive to the PWM signal delivered from the driver control unit 31.

The driving command unit 35 controls the motor driver unit 32, based on a general flow diagram described below, by comparing the vehicle's speed vc, detected by the vehicle speed sensor 33, with the vehicle speed threshold value Vs which has been preliminarily stored in the vehicle speed memory 34.

The target steering angle setting unit 21, which stores a target steering angle table (not shown) for a rear wheel steering angle, introduces various parameters on the basis of a traveling speed of the vehicle and a steering condition of the front wheels such that an optimum steering angle signal Dr and a target steering angle signal θr for the rear wheels are produced on the basis of the various parameters in terms of the target steering angle table.

The steering angular direction setting unit 22 selects either the left actuator 64L or the right actuator 64R responsive to the steering angle signal Dr and commands the solenoid energizing unit 23 such that it selectively energizes the left actuator 64L or the right actuator 64R and optionally switches on or off the two clutches of the rear wheel steering mechanism 50.

The driving angle measuring unit 26 converts a stroke signal of the driving angle sensor 42 into a signal representing a driving angle. There is a definite correlation between the driving angle and the steering angle detected by the steering angle sensor 41. Therefore, the sensor monitoring unit 27 is responsive to the output data of the steering angle measuring unit 25 and the driving angle measuring unit 26 for comparing the both output data such that when no correlation exists between the steering angle sensor 41 and the driving angle sensor 42, the sensor monitoring unit 27 judges some defects to have occurred on the steering angle sensor 41, the driving angle sensor 42 and the rear wheel steering mechanism 50 and produces an abnormal output signal to be delivered to the target steering angle setting unit 21. The target steering setting unit 21 stops the steering control by adjusting the target steering angle signal θr at "0 (zero)" responsive to the abnormal output signal.

Figure 10:
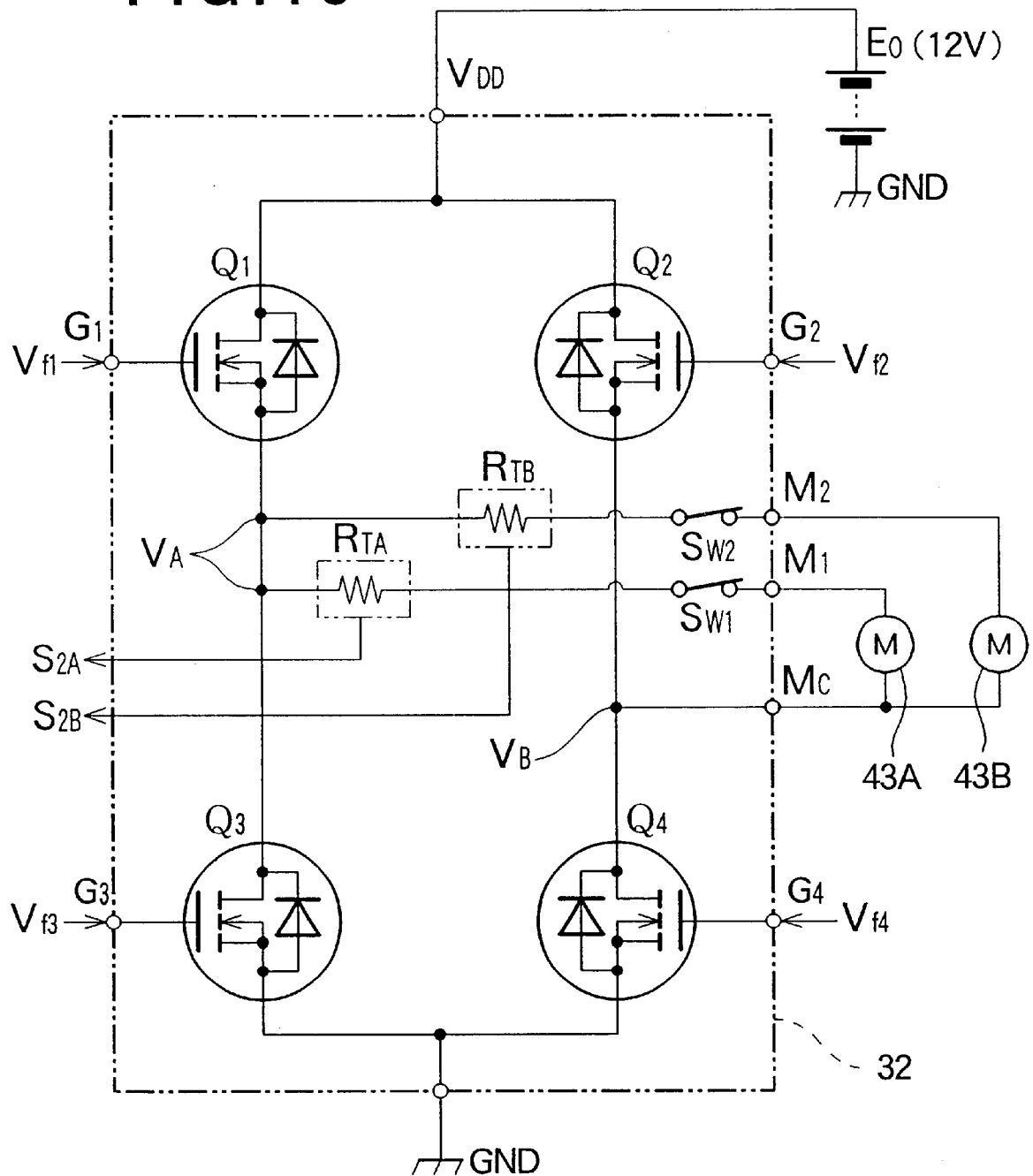
FIG. 10 is a circuit diagram showing examples of a driver circuit section of an electric motor shown in FIG. 9.

FIG. 10 illustrates a detailed circuit of the motor driver unit 32. In FIG. 10, the motor driver unit 32 is basically constructed of a bridge driver circuit in which four field effect transistors $Q_1$ to $Q_4$ (hereinafter referred to as "FETS") have four diodes for reversed by-pass flow of electric current and are connected in a bridge configuration. A battery $E_0$ provides power-supply voltage $V_{DD}$ at 12v to the bridge driver circuit. The two electric motors 43A and 43B are connected in parallel between midpoints $V_A$ and the midpoint $V_B$ of the bridge driver circuit, respectively. A relay switch SW1 and an electric current sensor $R_{TA}$ are connected in series between one of the midpoints $V_A$ and the electric motor 43A. Further, a relay switch SW2 and an electric current censor $R_{TB}$ are connected in series between the other one of the midpoints $V_A$ and the electric motor 43B.

Reference symbols $G_1$ to $G_4$ designate input terminals of the FETS $Q_1$ to $Q_4$. Reference symbols $V_{f1}$ to $V_{f4}$ designate the PWM control signals delivered from the driver control unit 31 shown in FIG. 9. Reference symbols $S_{2A}$ designates a motor condition signal of the electric motor 43A, which is determined on the basis of an electric current value measured by the electric current sensor $R_{TA}$. Similarly, reference symbol $S_{2B}$ designates a motor condition signal of the electric motor 43B, which is determined on the basis of an electric current value measured by the current sensor $R_{TB}$.

Now, the operation of the motor driver unit 32 is described below. For example, when the PWM control signals $V_{f1}$ and $V_{f2}$ are input to the input terminal $G_1$ and $G_4$, the FET $Q_1$ and PET $Q_4$ are turned on and electric current flows from FET $Q_1$ to midpoint $V_A$, to electric motors 43A and 43B, to midpoint $V_B$, to PET $Q_4$, and to grand GND, allowing the electric motors 43A and 43B to rotate in a forward direction. When the PWM control signals $V_{f2}$ and $V_{f3}$ are input to the input terminal $G_2$ and $G_3$, the FET $Q_2$ and FET $Q_3$ are turned on and the electric current flows from FET $Q_2$ to midpoint VB, to electric motors 43A and 43B, to midpoint $V_A$, to FET $Q_3$, and to grand GND, allowing the electric motors 43A and 43B to rotate in a reverse direction. In this manner, the electric motors 43A and 43B are allowed to rotate in the forward or reverse directions on the basis of a given duty cycle determined by the PWM control signal, responsive to conducting states of the four FETs $Q_1$ to $Q_4$. During this time period, the PWM control signals $V_{f1}$ to $V_{f4}$ and the motor condition signals $S_{2A}$ and $S_{2B}$ are input to the driving command unit 35 from the driver control unit 31 and the motor driver unit 32, respectively, as shown in FIG. 9. Thereafter, the driving command unit 35 judges the motor condition signals $S_{2A}$ and $S_{2B}$ to be normal or not, that is, the electric motors 43A and/or 43B are judged to be normal or not.

In the preferred embodiment discussed above, when the motor condition signal $S_{2A}$ is judged to be abnormal, the relay switch SW1 is turned off to stop the operation of the electric motor 43A, while the electric motor 43B may be continued in operation or stopped according to the conditions such as the vehicle speed in a manner as will be described below. That is, even when either motor condition signal $S_{2A}$ or $S_{2B}$ is judged to be abnormal, the operation of one of the electric motors 43A or 43B, which either has been normal, shall be continued if the specific conditions are satisfied.

The driving command unit 35 executes the control according to operating steps (hereinafter referred to as "ST" in the general flow diagram) shown in FIG. 11, responsive to the vehicle speed threshold value Vs stored in the vehicle speed memory 34, the vehicle speed Vc detected by the vehicle speed sensor 33 and the motor condition signal $S_{2A}$ and $S_{2B}$ delivered from the motor driver unit 32, which are shown in FIG. 9

Figure 11:
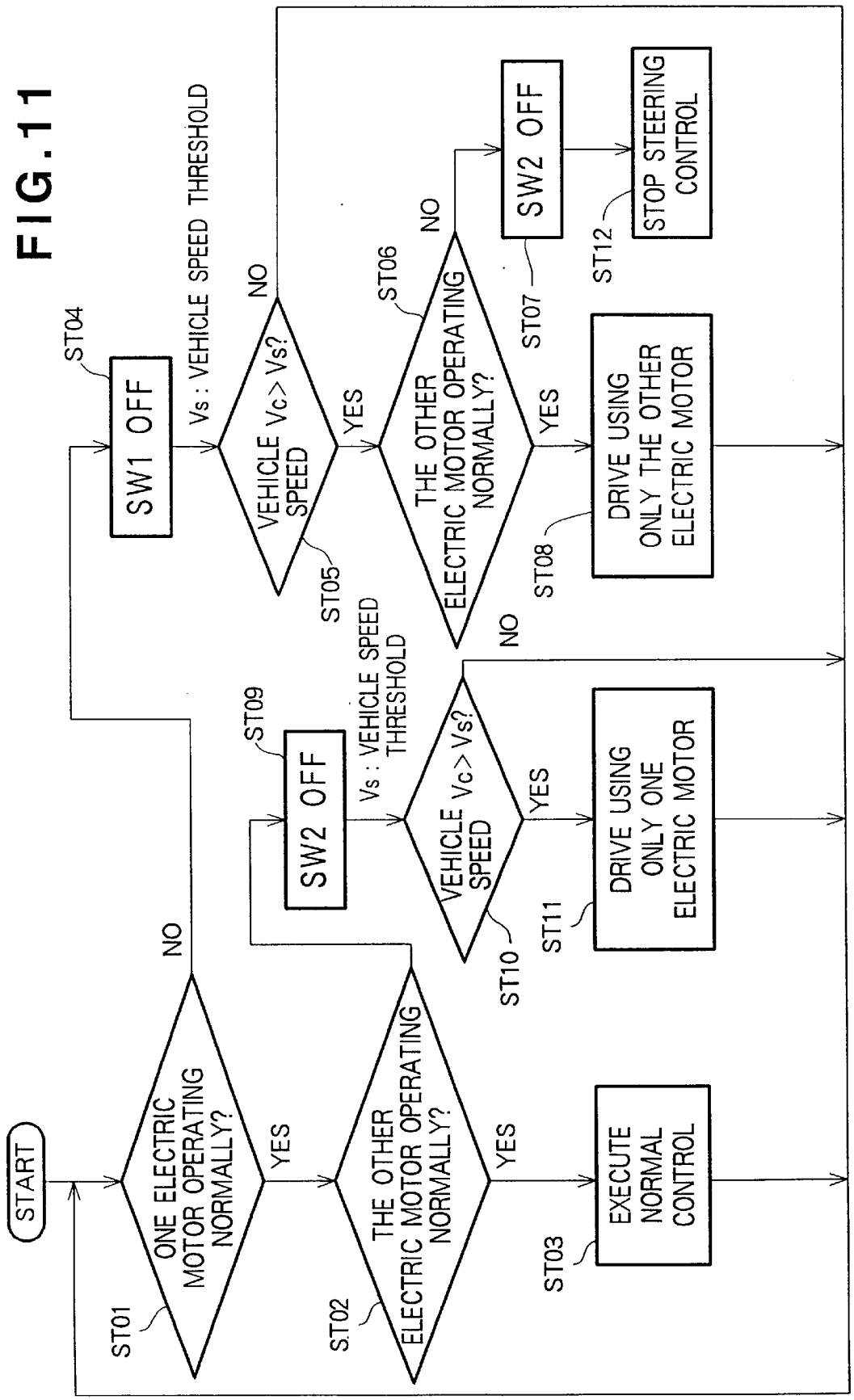
FIG. 11 is a general flow diagram illustrating the basic sequence of operations of a control circuit section shown in FIG. 9.

In FIG. 11, ST01: One electric motor 43A is judged to be normal or not. This judgment is executed by comparing the PWM control signals $V_{f1}$ to $V_{f4}$ with the motor condition signal $S_{2A}$. If the electric motor 43A is judged to be normal, operation forwards to step ST02, otherwise operation returns to step ST04. Furthermore, when the electric motor 43A is judged to be abnormal, the judgment will be maintained until the ignition switch of the vehicle (not shown) is turned off.

ST02: The other electric motor 43B is judged to be normal or not in the same manner as in ST01 by comparing the PWM control signals $V_{f1}$ to $V_{f4}$ with the motor condition signal $S_{2B}$. If the electric motor 43B is judged to be normal, operation forwards to step ST03, otherwise operation returns to step ST09. Further, when the electric motor 43B is judged to be abnormal, the judgment shall be maintained until the ignition switch of the vehicle (not shown) is turned off.

ST03: Since the two electric motors are operating under the normal condition, normal control is executed for the two electric motors 43A and 43B.

ST04: when one electric motor 43A is judged to be abnormal, the switch SW1 (see FIG. 10) is turned off. Then, the operation of the electric motor 43A is stopped.

ST05: Discrimination is executed whether the vehicle speed vc is higher than the vehicle speed threshold value Vs or not. The vehicle speed threshold value is preset to approximately 10 km/h. When the vehicle speed Vc exceeds the vehicle speed threshold value Vs, operation forwards to step ST07, otherwise operation returns to step ST01.

ST06: The other electric motor 43B is judged to be normal or not. When the electric motor 43B is judged to be normal, operation forwards to step ST08, otherwise operation returns to step ST06.

ST07: The switch SW2 (see FIG. 10) is turned off. Then, both of the switches Sw1 and SW2 remain in the turned-off states and the two electric motors 43A and 43B remain in the turned-off state. Accordingly, operation forwards to step ST12 to stop the steering control.

ST08: When it has been confirmed in ST07 that the other electric motor 43B is operating under the normal condition, control of only the other electric motor 43B is executed in step ST07.

ST09: When the other electric motor 43B is judged to be abnormal in step ST02, the switch SW2 is turned off, thereby stopping the operation of the electric motor 43B.

ST10: One electric motor 43A has been judged to be normal in step ST01. Then, the vehicle speed Vc is compared with the vehicle speed threshold value Vs. If the vehicle speed vc exceeds the vehicle speed threshold value Vs, operation forwards to step ST11, otherwise operation returns to step ST01.

ST11: The control of only one electric motor 43A, which is operating under the normal condition, is executed.

It will now be appreciated from the foregoing general flow diagram that, when both the electric motors 43A and 43B have been judged to be normal, normal control of these electric motors will be executed. Such case allows two electric motors 43A and 43B to load 50:50 output power, and therefore, each of the electric motor 43A and 43B results in a smaller-sized motor of less power output. A smaller-sized motor is low in manufacturing cost, with a resultant reduction in manufacturing cost of the steering control device.

When either two electric motors 43A or 43B are operating under the normal condition and the vehicle speed Vc is higher than the vehicle speed threshold value Vs, either normal electric motor, 43A or 43B, may continue its operation.

If the vehicle speed Vc is lower than the vehicle speed threshold value Vs, 50% output power overloads each of the electric motors 43A and 43B due to more torque required for steering at desired angle. On the contrary, when the vehicle speed Vc exceeds the vehicle speed threshold value Vs, 50% output power is sufficient enough for each of the electric motors 43A and 43B to drive, owing to the less torque required for steering at the desired angle.

In this manner, it is possible for driving control to be continued with the use of two electric motors 43A and 43B, even though specific conditions are required to be satisfied. This advantage can not be obtained in the conventional rear wheel steering device wherein control is executed only by a single electric motor.

Figure 12:
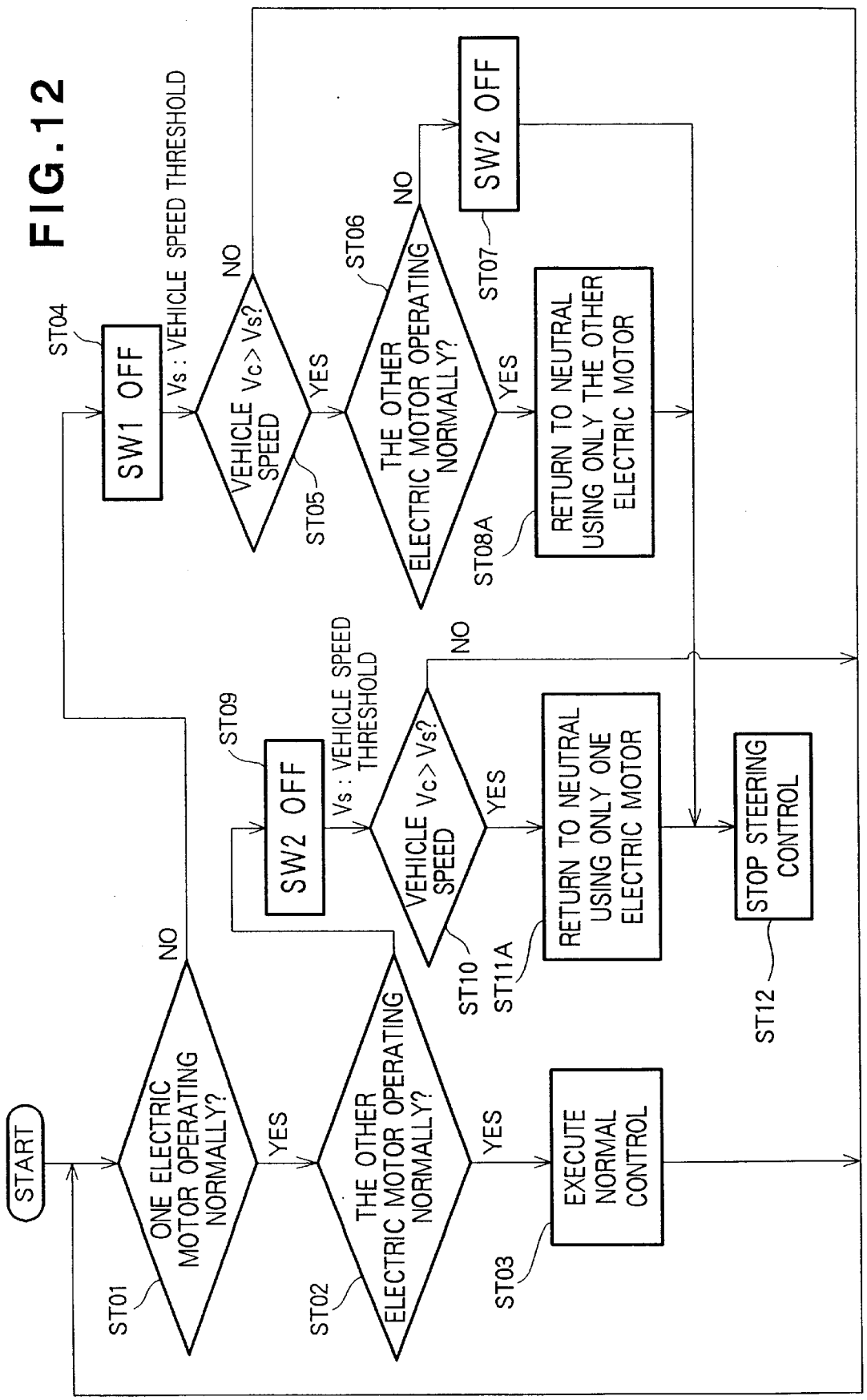
FIG. 12 is a general flow diagram illustrating the basic sequence of operations of a modified form of the control circuit section shown in FIG. 9.
Figure 13:
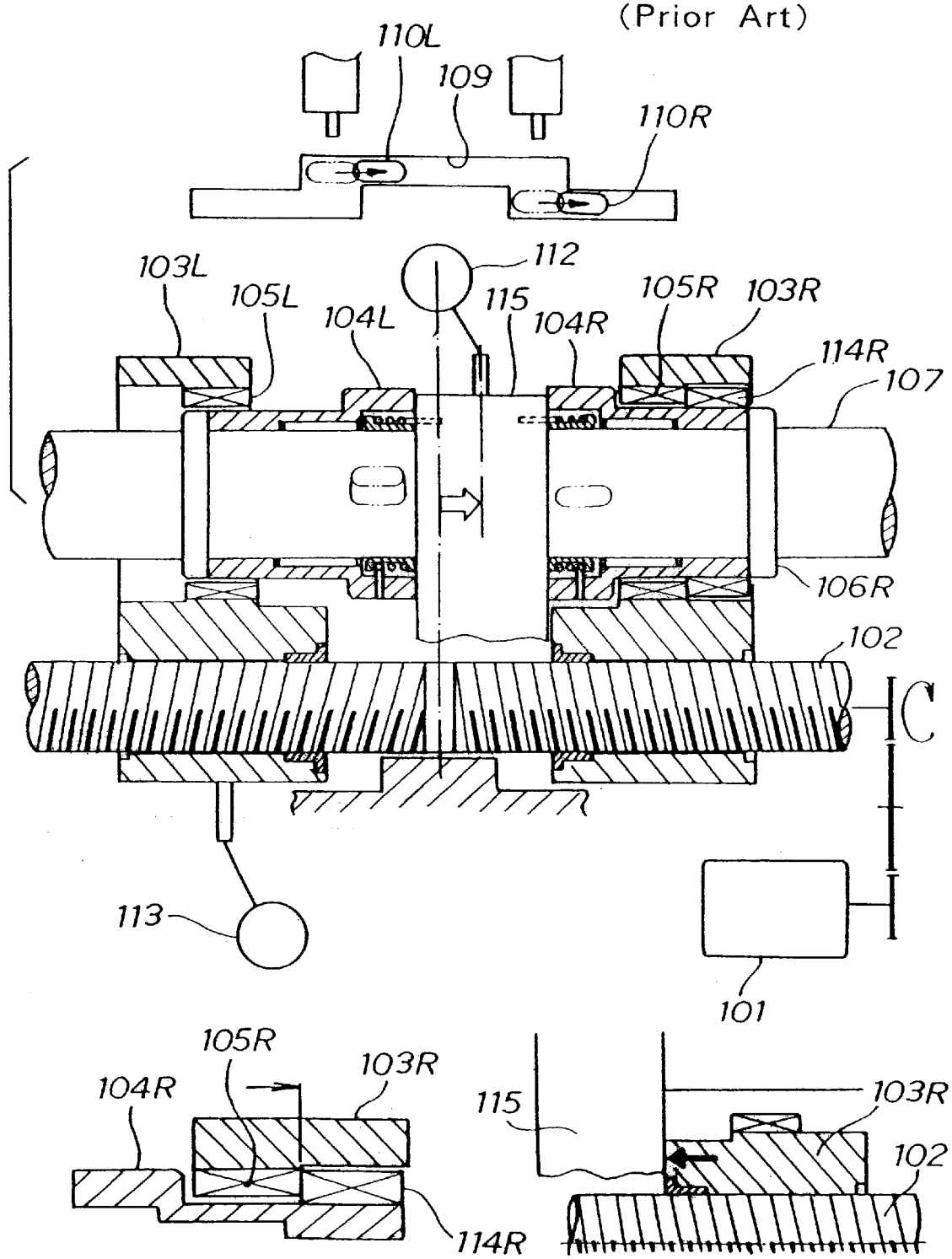
FIGS. 13A to 13C illustrate an operation of a conventional rear wheel steering device.
Figure 14:
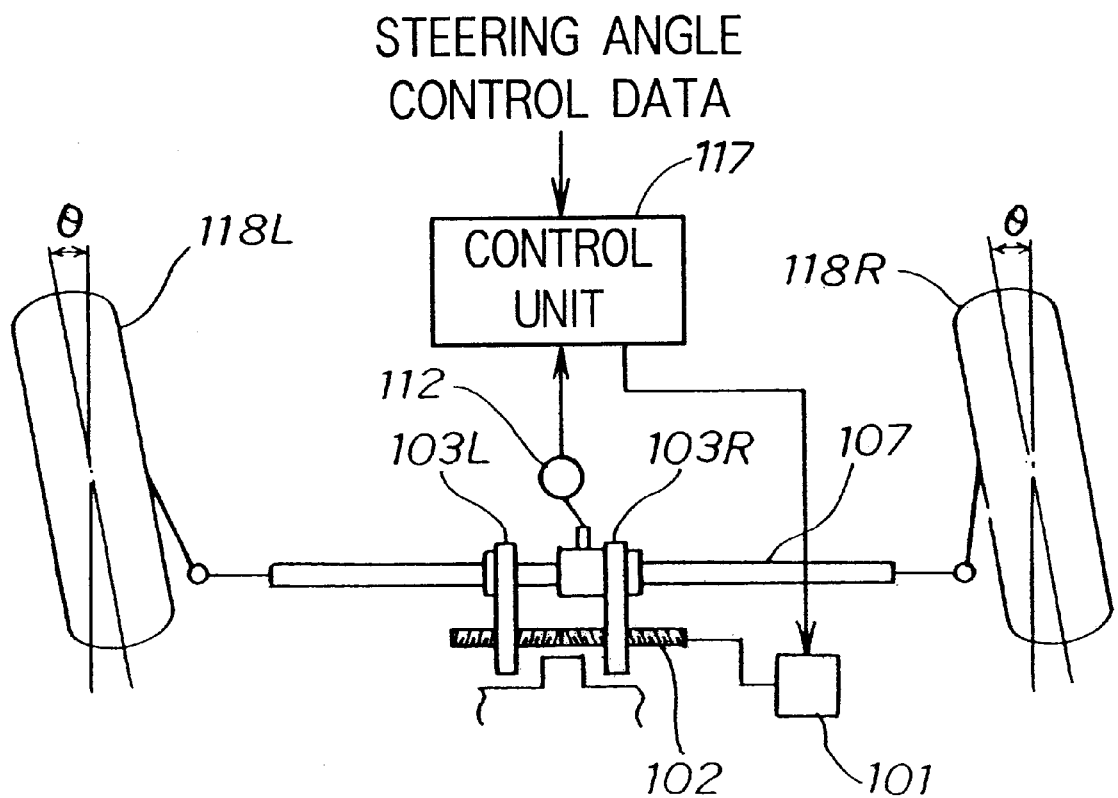
FIG. 14 is a diagram illustrating a principle of a conventional operation to steer rear wheels.

Now, a control method of a modified form of a driving command unit 35 is described according to a general flow diagram shown in FIG. 12. In FIG. 12, steps ST01 to ST07, which illustrate the basic sequence of operations of the modified form of the driving command unit 35, bear the same reference symbols as those of FIG. 11, and therefore, a detailed description of the same is herein omitted for the sake of simplicity while the steps, after step ST08A, will be described below.

ST08A: When the other electric motor 43B is judged to be normal in step ST06, operation forwards to step ST12 such that the steering shaft 59 (see FIG. 7) is returned to the neutral position by only the other electric motor 43B and, subsequently, steering control is stopped. Specifically, in FIG. 7, the electric motor 43B is rotated in the reverse direction such that the slide cylinders 52L and 52R are moved closer to each other to assume a mechanically neutral position as shown in FIG. 4A Thereafter, an alarm indicator such as an alarm lamp, which is not shown, is lighted up and the steering control is stopped.

ST09: When the other electric motor 43B is judged to be abnormal in step ST02, the switch SW2 is turned off, thereby stopping the operation of the electric motor 43B.

ST10: Since the one electric motor 43A has been judged to be normal in step ST01, judgment is performed whether the vehicle speed Vc exceeds the given vehicle speed or below the same. When the vehicle speed is judged to be higher than the vehicle speed threshold value Vs, operation forwards to step ST11A, otherwise operation returns to step ST01.

ST11A: The steering shaft 59 (see FIG. 7) is returned to the neutral position with only one normal electric motor 43B and, subsequently, operation forwards to step ST12 to stop the steering control. More particularly, in FIG. 7, the electric motor 43A is driven in the reverse direction to cause the slide cylinders 52L and 52R to approach each other to assume the mechanically neutral position as shown in FIG. 4A. Thereafter, an alarm indicator such as an alarm lamp, not shown, is lighted up and the steering control is stopped.

In the modified form discussed above, when either of the two electric motors 43A and 43B is under the normal condition and the vehicle speed is higher than the vehicle speed threshold value, the rear wheel is preferably returned to the neutral position by either normal electric motor, 43A or 43B.

When the vehicle speed is lower than the vehicle speed threshold value, 50% output power overloads each of the electric motors 43A and 43B due to more torque required for steering at the desired angle. On the other hand, when the vehicle speed is higher than the vehicle speed threshold value, 50% output power is sufficient enough for the rear wheel to return to the neutral position owing to the less torque required for the steering at the desired angle.

In this manner, the rear wheel steering device may be returned to the neutral condition by employing two electric motors 43A and 43B, even though specific conditions are required to be satisfied. This advantage cannot be obtained in the conventional rear wheel steering device wherein steering control is executed with a single electric motor.

The rear wheel steering mechanism 50, which forms a mechanical section of the rear wheel steering device 10 of this invention, is not limited to the mechanism shown in FIGS. 2 to FIG. 8, and any other mechanisms may be optionally employed as long as the mechanisms are driven with the electric motors to steer the rear wheels.

In FIG. 4A, each clutch may be located between each of the electric motors 43A and 43B, and each of the gears 44 and 44 since either of the electric motors 43A or 43B, which is not operated when some troubles are encountered, may be shut off from the driving system. In FIG. 9, furthermore, two motor driver units 32 may be employed and may be to connected to the respective electric motors 43A and 43B.

Finally, the vehicle speed threshold value Vs may be optional, for example, may be preset to approximately 2 km/h.

Obviously, various minor changes and modifications of the present invention are possible in the light of the above teaching. It is therefore to be understood that within the scope of appended claims, the invention may be practiced otherwise than as specifically described.

What is claimed is:

1. A rear wheel steering device for use in a vehicle, comprising:

two electric motors serving as drive sources for steering rear wheels of the vehicle;

a rear wheel steering control device for controlling the two electric motors such that the two electric motors are driven when the two electric motors are both judged to be normal on the basis of motor condition signals indicative of operating conditions of the two electric motors; and a vehicle speed sensor for detecting a vehicle speed, and wherein, when one of the electric motors is in an abnormal state while the other one of the electric motors is in a normal state, the rear wheel steering control device is designed to control steering of the rear wheels using the electric motor in the normal state only when the vehicle speed detected by the vehicle speed sensor exceeds a given speed so that the resulting steering torque is small enough to enable steering of the rear wheels at a desired angle by only the electric motor in the normal state.

2. A rear wheel steering device for use in a vehicle, comprising:

two electric motors serving as drive sources for steering rear wheels of the vehicle;

a rear wheel steering control device for controlling the two electric motors such that the two electric motors are driven when the two electric motors are both judged to be normal on the basis of motor condition signals indicative of operating conditions of the two electric motors; and a vehicle' speed sensor for detecting a vehicle speed, and wherein, when one of the electric motors is in an abnormal state while the other one of the electric motors is in a normal state and when the vehicle speed detected by the vehicle speed sensor exceeds a given speed, the rear wheel steering control device controls, using only the in-normal-state electric motor, steering of the rear wheels to cause the rear wheels to be returned to a neutral position.

* * * * *